United States Patent
Jiang

(10) Patent No.: US 10,838,041 B2
(45) Date of Patent: Nov. 17, 2020

(54) INTELLIGENT VEHICLE-MOUNTED RADAR DEVICE FOR REDUCING SIGNAL INTERFERENCE

(71) Applicant: Beijing Rongchuangyuanda Network Technology Co. Ltd., Beijing (CN)

(72) Inventor: Huan Jiang, Shenzhen (CN)

(73) Assignee: Guohui Hu, Shenzhen (CN)

( * ) Notice: Subject to any disclaimer, the term of this patent is extended or adjusted under 35 U.S.C. 154(b) by 403 days.

(21) Appl. No.: 15/859,521

(22) Filed: Dec. 31, 2017

(65) Prior Publication Data

US 2019/0204412 A1 Jul. 4, 2019

(30) Foreign Application Priority Data

Dec. 28, 2017 (CN) .......................... 2017 1 1454022

(51) Int. Cl.
*G01S 7/40* (2006.01)
*G01S 13/931* (2020.01)
*G01S 7/02* (2006.01)
*G01S 13/60* (2006.01)

(52) U.S. Cl.
CPC ............ *G01S 7/4004* (2013.01); *G01S 7/023* (2013.01); *G01S 7/024* (2013.01); *G01S 13/931* (2013.01); *G01S 13/60* (2013.01)

(58) Field of Classification Search
CPC ......... G01S 7/4004; G01S 7/023; G01S 7/024
See application file for complete search history.

(56) References Cited

U.S. PATENT DOCUMENTS

| | | | |
|---|---|---|---|
| 7,522,092 B2 * | 4/2009 | Okai ..................... | G01S 13/931 342/70 |
| 7,546,092 B1 * | 6/2009 | Murdoch ................ | G01S 13/74 455/121 |
| 8,010,048 B2 * | 8/2011 | Brommer .......... | G06K 19/07756 455/41.2 |
| 8,085,183 B2 * | 12/2011 | Hildebrandt ............ | G01S 7/036 342/70 |
| 2010/0201189 A1 * | 8/2010 | Kirby ...................... | H02J 50/60 307/9.1 |
| 2015/0369910 A1 * | 12/2015 | Griebeler ............... | H04B 1/719 342/22 |

* cited by examiner

*Primary Examiner* — Marcus E Windrich
(74) *Attorney, Agent, or Firm* — Cheng-Ju Chiang

(57) ABSTRACT

Disclosed is an intelligent vehicle-mounted radar device for reducing signal interference, wherein the antenna module includes a dual-polarized antenna, namely, any polarized signal can be measured, and polarization information can be processed and extracted in real time by the polarization digital processor module, the present invention is featured by rapid and real-time. In addition, when the local oscillation module is turned on, the first rectifier diode, the first switch module, the first resistor, the second resistor and the second rectifier diode make the current flowing through the local oscillation module rise gradually to suppress signal interference, and thus improve the performance of the intelligent vehicle-mounted radar device.

3 Claims, 4 Drawing Sheets

INTELLIGENT VEHICLE-MOUNTED RADAR DEVICE FOR REDUCING SIGNAL INTERFERENCE

TECHNICAL FIELD OF THE INVENTION

The present invention relates to the technical field of vehicle-mounted radars, and more particularly to an intelligent vehicle-mounted radar device for reducing signal interference.

BACKGROUND

With the development of Internet of Vehicles (IoV) technology, the application space of vehicle-mounted radar technology becomes larger and larger, for example, vehicles on highways are numerous and various accidents occur frequently. A vehicle-mounted radar device can measure and display the distance from an exterior obstacle to the vehicle. The detection is rapid, convenient, easy to calculate and easy to control in real time. However, the problem in the industry is how to improve the performance of the intelligent vehicle-mounted radar device.

SUMMARY

In view of the above problems, embodiments of the present invention provide an intelligent vehicle-mounted radar device that partially or entirely solves the above problems, which can effectively reduce the signal interference to the local oscillation module, and thus improve the performance of the intelligent vehicle-mounted radar device.

In order to solve the above technical problem, the present application adopts the following technical solutions:

According to an embodiment of the present invention, there is provided an intelligent vehicle-mounted radar device for reducing signal interference, including a transmitting unit for transmitting radar waves and a receiving unit for receiving radar waves transmitted from an external object, wherein the receiving unit includes an antenna module, two microwave front-end modules, a local oscillation module, two intermediate frequency (IF) amplification modules, two analog-to-digital (A/D) conversion modules, a memory module, a polarization digital processor module, a polarization control module, a first resistor, a second resistor, a first capacitor, a first rectifier diode, a second rectifier diode and a first switch module;

the antenna module and the local oscillation module are both connected to the two microwave front-end modules, the two microwave front-end modules are connected to the two IF amplification modules, respectively, the two IF amplification modules are connected to the two analog-to-digital conversion modules, respectively, the two analog-to-digital conversion modules are both connected to the memory module, the memory module is connected to the polarization digital processor module, the polarization control module is connected to the antenna module, the local oscillation module is connected to the first rectifier diode, the first switch module and the second rectifier diode, respectively, the first resistor is connected to the first rectifier diode, the second resistor, the first capacitor and the first switch module, respectively, one end of the first capacitor is connected to the first resistor, the first switch module and the second resistor, respectively, the other end of the first capacitor is connected to the second resistor, the first switch module and the second rectifier diode, respectively; a radar wave signal is received by the antenna module, the received radar wave signal is selected by a corresponding microwave front-end module, amplified to an intermediate frequency (IF) signal via the IF amplification module, converted to a digital signal via a corresponding analog-to-digital conversion module, and cached via the memory module, and polarization information is extracted by the polarization digital processor module from information cached by the memory module, when the local oscillation module is turned on, the first rectifier diode, the first switch module, the first resistor, the second resistor and the second rectifier diode make the current flowing through the local oscillation module rise gradually to suppress signal interference.

According to an embodiment of the present invention, there is provided an intelligent vehicle-mounted radar device for reducing signal interference, wherein, the antenna module can include a dual-polarized antenna, that is, any polarized signal can be measured, and polarization information can be processed and extracted in real time by the polarization digital processor module, the present invention is featured by rapid and real-time. In addition, when the local oscillation module is turned on, the first rectifier diode, the first switch module, the first resistor, the second resistor and the second rectifier diode make the current flowing through the local oscillation module rise gradually to suppress signal interference, and thus improve the performance of the intelligent vehicle-mounted radar device.

DETAILED DESCRIPTION OF THE INVENTION

Figure 1:
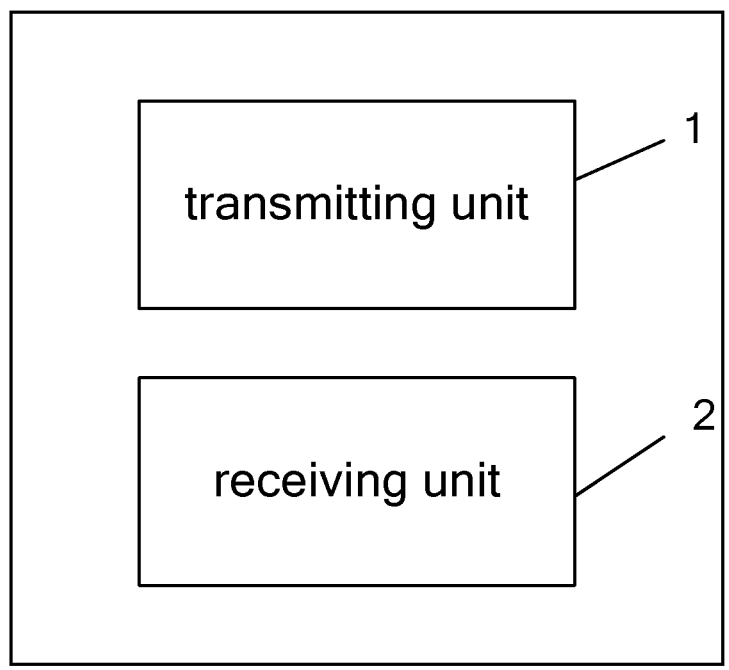
FIG. 1 is a composition schematic diagram of an intelligent vehicle-mounted radar device according to the present invention.
Figure 2:
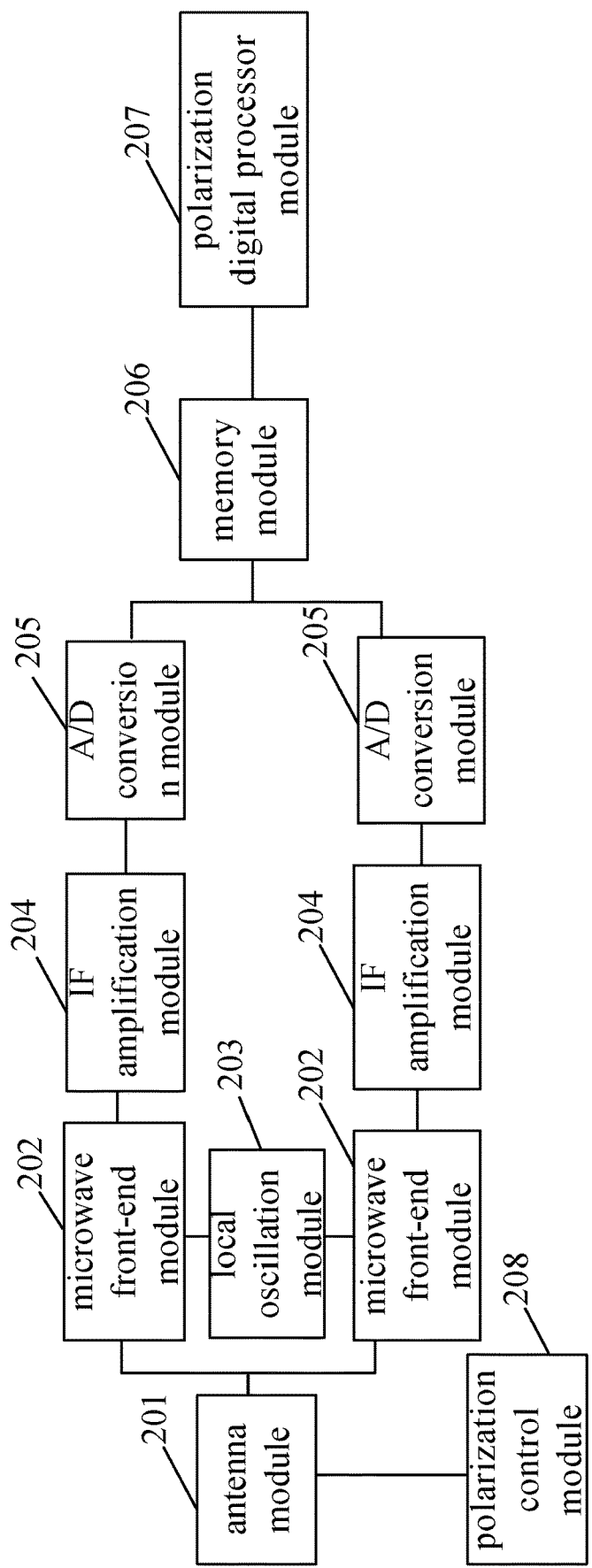
FIG. 2 is a composition block diagram of a receiving unit in an intelligent vehicle-mounted radar device according to the present invention.
Figure 3:
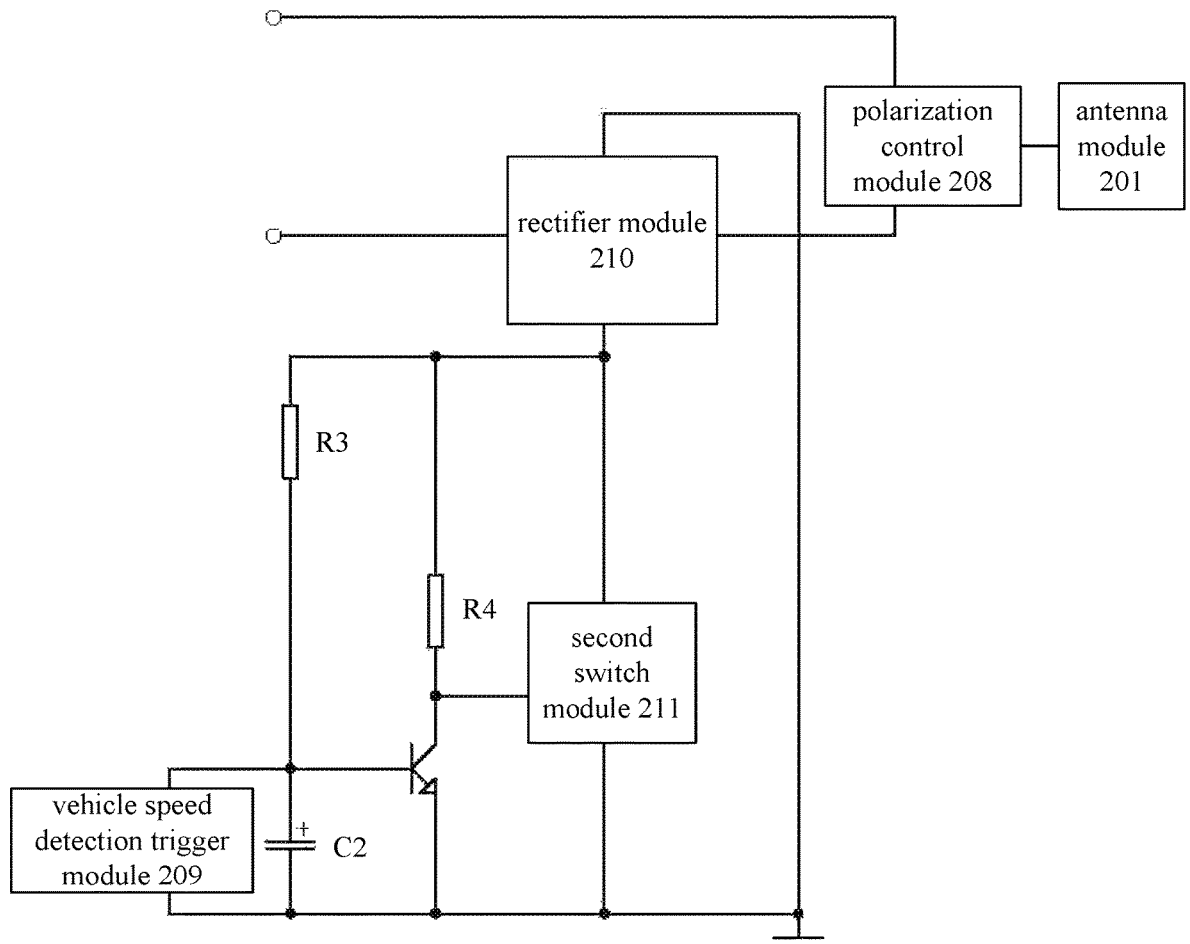
FIG. 3 is a schematic diagram of controlling a polarization control module to perform polarization calibration in an intelligent vehicle-mounted radar device according to the present invention.

Referring to FIG. 1, which is a composition schematic diagram of an intelligent vehicle-mounted radar device according to the present invention, the device includes a transmitting unit 1 for transmitting radar waves and a receiving unit 2 for receiving radar waves transmitted from an external object, referring to FIG. 2, in order to extract polarization information, as a specific embodiment, the receiving unit 2 includes an antenna module 201, two microwave front-end modules 202, a local oscillation module 203, two intermediate frequency (IF) amplification modules 204, two analog-to-digital conversion modules 205, a memory module 206, a polarization digital processor module 207, a polarization control module 208, besides, referring to FIG. 3, as an aspect of the present invention, in order to control polarization interference, the vehicle-mounted radar device according to the present invention further includes a vehicle speed detection trigger module 209, a rectifier module 210, a second switch module 211, a crystal triode VT, a third resistor R3, a fourth resistor R4 and a second capacitor C2;

During specific implementation, the antenna module 201 and the local oscillation module 203 are both connected to the two microwave front-end modules 202, the two microwave front-end modules 202 are connected to the two IF amplification modules 204, respectively, the two IF amplification modules 204 are connected to the two analog-to-digital conversion modules, respectively, the two analog-to-digital conversion modules 205 are both connected to the memory module 206, the memory module 206 is connected to the polarization digital processor module 207, the polarization control module 208 is connected to the antenna module 201, the vehicle speed detection trigger module 209 is connected to the third resistor R3, the second capacitor C2 and a base of the crystal triode VT, a collector of the crystal triode VT is connected to the fourth resistor R4 and the second switch module 211, the second switch module 211 is connected to the polarization control module 208 via the rectifier module 210;

during specific implementation, the antenna module 201 is configured to receive a radar wave signal transmitted from an external object, the microwave front-end module 202 is configured to select and mix a signal received by the antenna module 201 with a local oscillation signal transmitted by the local oscillation module 203 to an intermediate frequency (IF) signal, the IF amplification module 204 amplifies the IF signal transmitted by the microwave front-end module 202, the analog-to-digital conversion module 205 A/D-converts the amplified IF signal to a digital signal, the A/D-converted digital signal information is cached by the memory module 206, and the polarization digital processor module 207 extracts polarization information from the information cached by the memory module 206, particularly, the antenna module 201 can adopt a dual-polarized antenna, for receiving left-hand and right-hand circularly polarized signals, and a detailed description is omitted here.

It should be noted that, when a vehicle speed is greater than a certain value, the antenna of the vehicle-mounted radar device can be easily subjected to resonance, that is, resonance interference is formed on the antenna of the vehicle-mounted radar device, so that polarization loss is reduced, and deviation of the extracted polarization information occurs. In order to solve the problem, according to the present invention, when detecting the vehicle speed is greater than a first preset value, the vehicle speed detection trigger module 209 triggers the second capacitor C2 to discharge, causing the base of the crystal triode VT to cut off and the collector potential to increase, and thereby controls ON of the second switch module 211, the polarization control module 208 controls the antenna module 201 to perform polarization calibration. During specific implementation, the first preset value can be a vehicle speed value for generating resonance interference according to different types of antenna tests, and the specific value is not limited herein. In addition, the second switch module 211 in the present invention can adopt devices, such as a thyristor, which can be turned on by triggering a gate electrode through a trigger signal, in addition, as a specific embodiment, the vehicle speed detection trigger module 209 can include a vehicle speed detection sub-module and a switch control sub-module, wherein, the vehicle speed detection sub-module is configured to detect the speed of the vehicle where the vehicle-mounted radar device is located, and the switch control sub-module is configured to control charging and discharging of the second capacitor C2 according to the vehicle speed detected by the vehicle speed detection sub-module.

It should be noted that, when a vehicle speed is less than a certain value, resonance interference has a less influence, that is, polarization loss substantially has no influence, and polarization calibration needs to be turned off, according to the present invention, when the vehicle speed is less than a second preset value, namely, the vehicle speed detection trigger module 209 detects the vehicle speed is less than a second preset value, charging of the second capacitor is controlled to turn off the polarization calibration, however, during specific implementation, although the vehicle speed has been reduced, resonance interference may last for a period of time, and the polarization control module may remain in operation for a period of time, to this end, control can be achieved in the present invention by the charging time of the third resistor R3 and the second capacitor C2, that is, when the output end voltage of the rectifier module charges the second capacitor C2 through the third resistor R3, and the voltage at the two ends of the second capacitor C2 rises to be sufficient to enable the crystal triode VT to be turned on again, the gate electrode of the thyristor serving as the second switch module is equivalent to the ground again, there is no trigger voltage, and then the thyristor, as the second switch module, is turned off, the polarization control module no longer works, and then the charging time of the second capacitor C2 is the working time of the polarization control module, to guarantee that at least one complete polarization calibration can be achieved in the present invention, the third resistor R3 and the second capacitor C2 are charged such that the charging time is at least one interval period of performing polarization calibration by the polarization control module, so that the polarization control module further can work for at least one complete calibration period, and a detailed description is omitted here.

Figure 4:
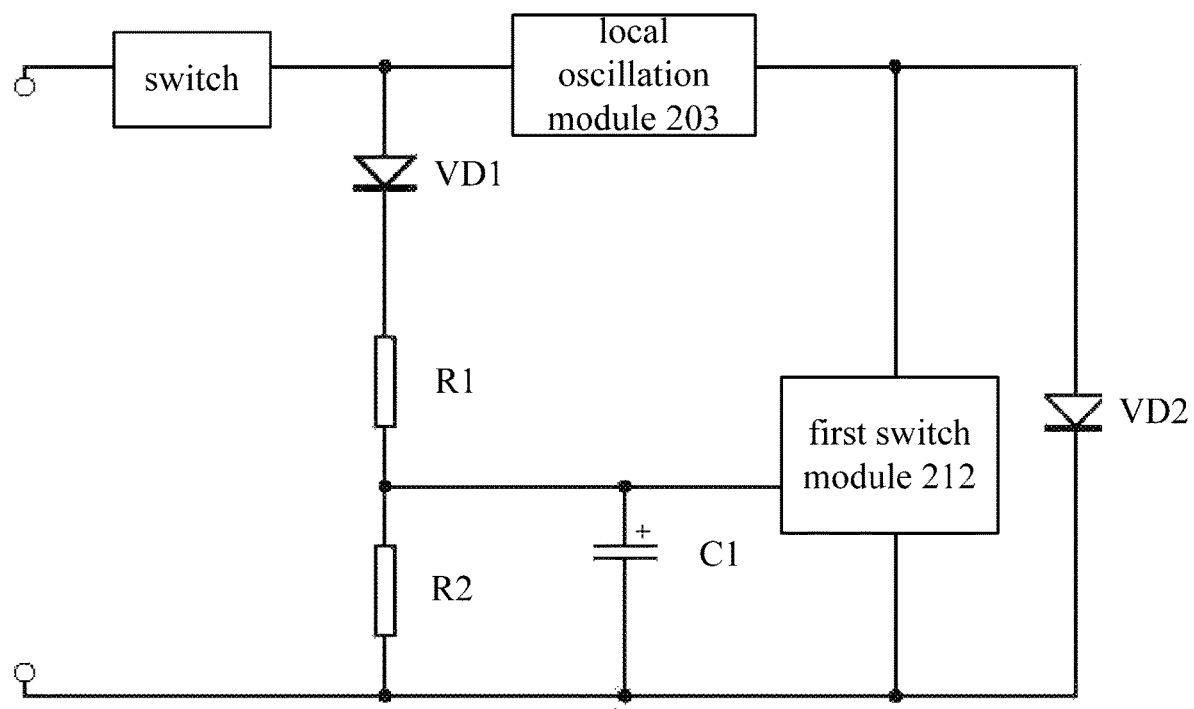
FIG. 4 is a schematic diagram of preventing signal interference in local oscillation module in an intelligent vehicle-mounted radar device according to the present invention.

Further, referring to FIG. 4, as an aspect of the present invention, when a local oscillation module 203 starts, the current sudden change in the circuit can form larger signal interference to the local oscillation module 203, in order to solve the problem, the device according to the present invention further include a first resistor R1, a second resistor R2, a first capacitor C1, a first rectifier diode VD1, a second rectifier diode VD2 and a first switch module 212, taking the first switch module as a thyristor for example, when the circuit where the local oscillation module is located is turned on, due to the characteristics of the capacitor, the voltage at the two ends of the first capacitor C1 cannot be suddenly changed, that is, the voltage at the two ends of the first capacitor C1 is zero, the thyristor, as the first switch module 212 is cut off since there is no trigger voltage, and therefore, the current flowing through the local oscillation module is a half-wave current after being rectified by the second rectifier diode VD2, at this time, the first capacitor C1 is charged via the first rectifier diode VD1 and the first resistor R1, after a certain time delay, and the voltage of the two ends of the first capacitor C1 rises to be the turn-on level of the thyristor serving as the first switch module 212, the thyristor, as the second switch module 212 is turned on, that is, the current is gradually increased, the influence of current sudden change is small, and signal interference to the local oscillator module is reduced.

What is claimed is:
1. An intelligent vehicle-mounted radar device for reducing signal interference, comprising a transmitting unit for transmitting radar waves and a receiving unit for receiving radar waves transmitted from an external object; wherein the receiving unit comprises an antenna module, two microwave front-end modules, a local oscillation module, two intermediate frequency (IF) amplification modules, two analog-to-digital conversion modules, a memory module, a polarization digital processor module, a polarization control module, a first resistor, a second resistor, a first capacitor, a first rectifier diode, a second rectifier diode and a first switch module;

the antenna module and the local oscillation module are both connected to the two microwave front-end modules, the two microwave front-end modules are connected to the two IF amplification modules, respectively, the two IF amplification modules are connected to the two analog-to-digital conversion modules, respectively, the two analog-to-digital conversion modules are both connected to the memory module, the memory module is connected to the polarization digital processor module, the polarization control module is connected to the antenna module, the local oscillation module is connected to the first rectifier diode, the first switch module and the second rectifier diode, respectively, the first resistor is connected to the first rectifier diode, the second resistor, the first capacitor and the first switch module, respectively, one end of the first capacitor is connected to the first resistor, the first switch module and the second resistor, respectively, the other end of the first capacitor is connected to the second resistor, the first switch module and the second rectifier diode, respectively; a radar wave signal is received by the antenna module, the received radar wave signal is selected by a corresponding microwave front-end module, amplified to an intermediate frequency (IF) signal via the IF amplification module, converted to a digital signal via a corresponding analog-to-digital conversion module, and cached via the memory module, and polarization information is extracted by the polarization digital processor module from information cached by the memory module, when the local oscillation module is turned on, the first rectifier diode, the first switch module, the first resistor, the second resistor and the second rectifier diode make the current flowing through the local oscillation module rise gradually to suppress signal interference.

2. The intelligent vehicle-mounted radar device for reducing signal interference according to claim 1, further comprising: a vehicle speed detection trigger module, a rectifier module, a crystal triode, a third resistor, a fourth resistor, a second capacitor, and a second switch module, wherein, the vehicle speed detection trigger module is connected to the third resistor, the second capacitor and a base of the crystal triode, a collector of the crystal triode is connected to the fourth resistor and the second switch module, the second switch module is connected to the polarization control module via the rectifier module; when detecting a vehicle speed is greater than a first preset value, the vehicle speed detection trigger module triggers the second capacitor to discharge, causing the base of the crystal triode to cut off and the collector potential to increase, and thereby controls ON of the second switch module, the polarization control module controls the antenna module to perform polarization calibration.

3. The intelligent vehicle-mounted radar device for reducing signal interference according to claim 2, wherein, the first switch module and the second switch module are both thyristors.

* * * * *